Feb. 26, 1963
F. SCHNEIDER
3,079,122
HOSE COUPLING COMPRISING TWO BAYONET-TYPE
COUPLING HALVES FOR TRUCK BRAKES
Filed July 1, 1959
4 Sheets-Sheet 3

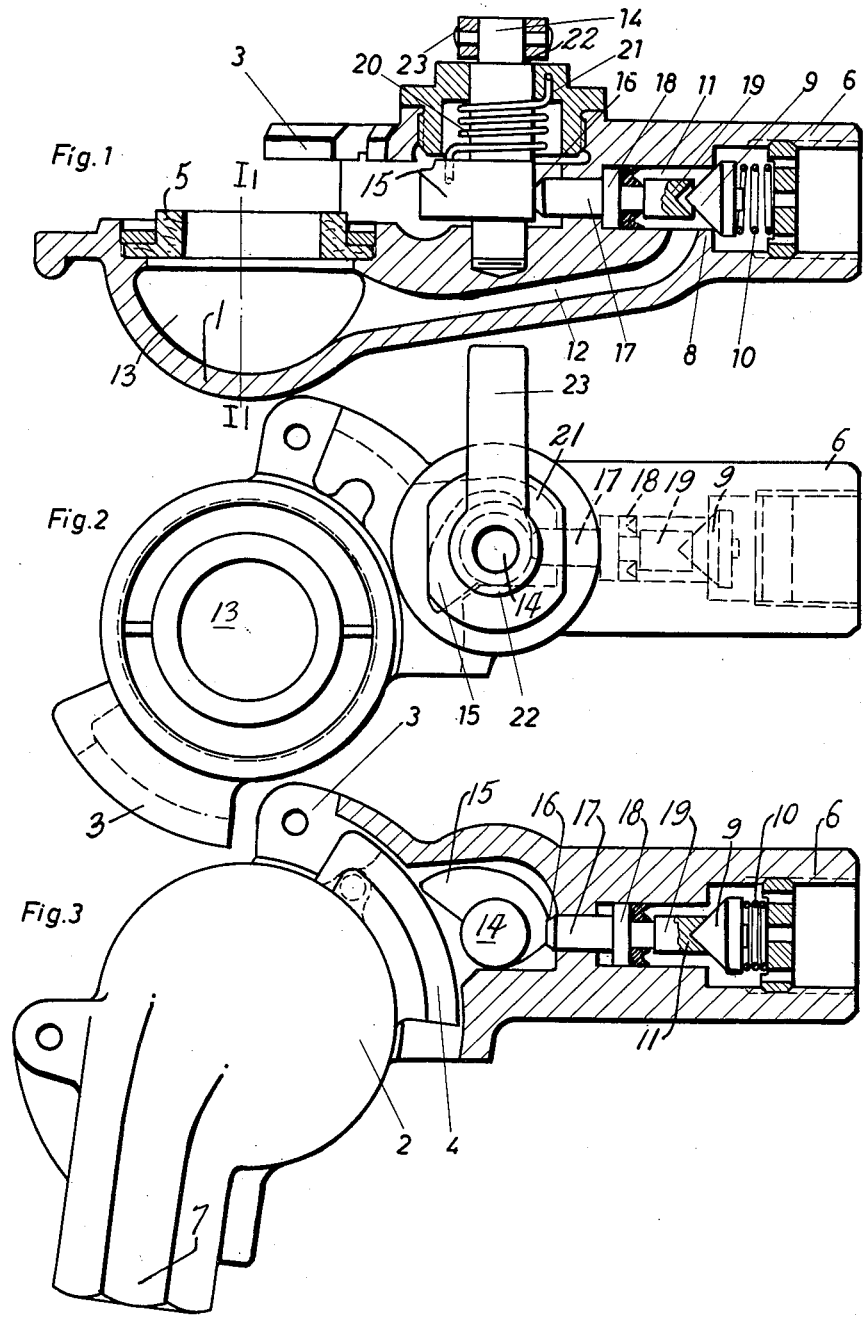

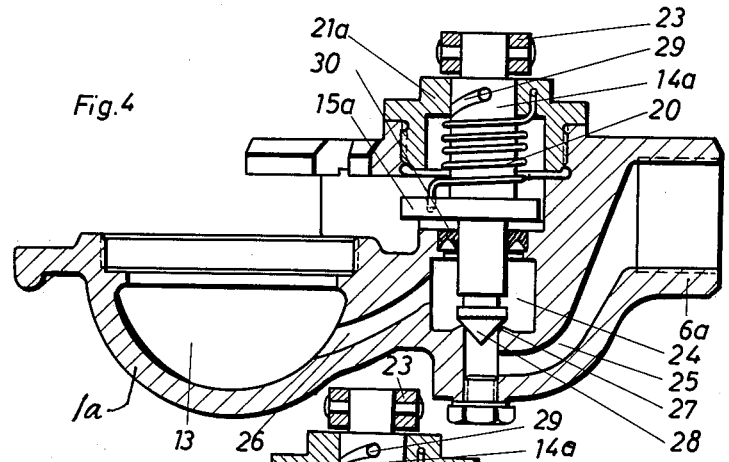
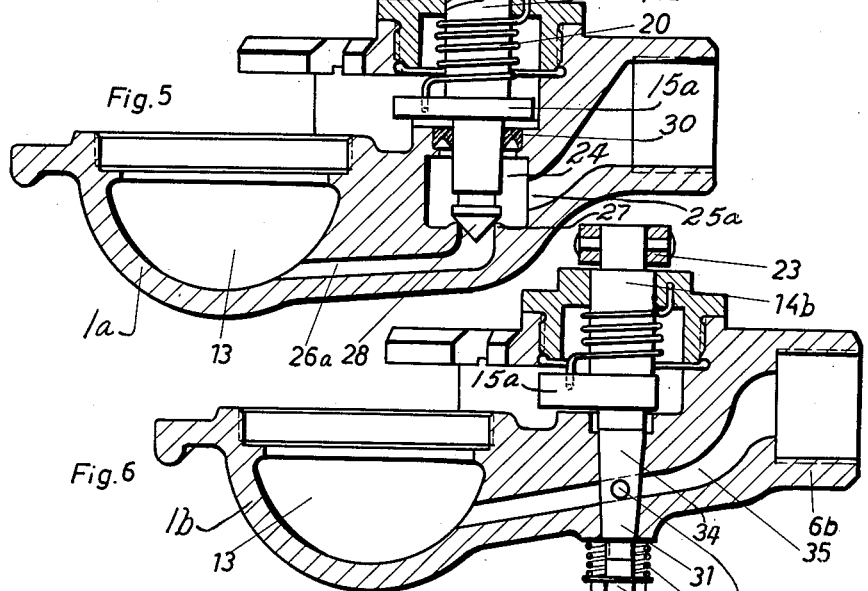
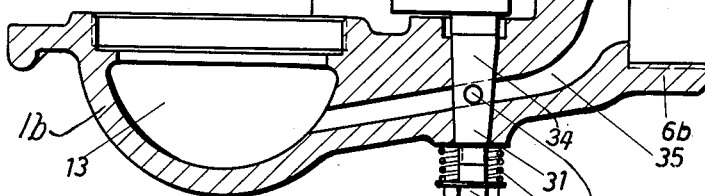
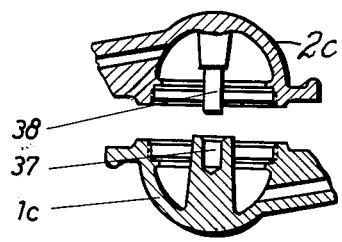

INVENTOR:
Friedrich Schneider
BY Ernest Montague
Attorney

Feb. 26, 1963  F. SCHNEIDER  3,079,122
HOSE COUPLING COMPRISING TWO BAYONET-TYPE
COUPLING HALVES FOR TRUCK BRAKES
Filed July 1, 1959  4 Sheets-Sheet 4

INVENTOR.
Friedrich Schneider
BY Ernest Montague
Attorney 3,079,122
HOSE COUPLING COMPRISING TWO BAYONET-TYPE COUPLING HALVES FOR TRUCK BRAKES
Friedrich Schneider, Heidelberg, Germany, assignor to Firma Graubremse G.m.b.H., Heidelberg, Germany, a corporation of Germany
Filed July 1, 1959, Ser. No. 823,498
6 Claims. (Cl. 251—89.5)

The present invention relates to a hose coupling for truck brakes which comprises two coupling heads to be connected with each other like a bayonet catch.

It is already known to provide the coupling, half of such coupling which is adapted to be fitted on the feed line, with a shutoff device located outside the axis of rotation of the coupling halves and having a control member co-operating with the periphery of the other coupling half for positive opening of the shutoff device, so that the latter is opened through means of the control member when for connection of the coupling halves these are turned into their end position. This design of the coupling ensures that compressed-air is actually available for braking a trailer. It is a disadvantage of these couplings, however, that the shutoff device may remain in open position and compressed air may escape from the air tank of the brake system, when the shutoff device is not closed by hand before disengaging the coupling halves.

Furthermore, hose couplings are known in which a spring-loaded valve plate is provided in the coupling head fitted on the feed line. When the coupling half, which is unprotected in disengaged position, is not clogged with dirt, the valve plate interrupts the feed of compressed air. However, when engaging the coupling, the valve has to be opened by compressing the coupling halves against the pressure of the air and the pressure of the spring. This is difficult, and compressed air easily escapes at a high rate. To avoid this, a separate, manually operated shutoff device is provided which, however, requires special attention of the operator to ensure operating safety of the brake system, since the additional shutoff device has to be opened by hand after engaging the coupling halves.

It is, therefore, one object of the present invention to provide a hose coupling which eliminates the above described deficiencies.

It is another object of the present invention to provide a hose coupling wherein the hose coupling combines, in a simple and convenient way, the advantageous features of known couplings and at the same time eliminates possible operating mistakes. The shutoff device is closed and opened fully automatic and allows for the coupling to be engaged without effort, and the shutoff device and its actuating members are arranged at a protected place. According to the present invention, the control member is formed of a control shaft with an axial control cam which extends into the path of motion of a guide rail on the other coupling half and which is subjected to the action of a spring which is protected against external damage and which acts in known manner on the parts to automatically close the shutoff device when the coupling is disengaged.

Conveniently, the control cam co-operates with a push-rod which lifts the shutoff valve off its seat, or the control shaft may form a valve body which is axially displaced in its bearing, inclined planes and projections being arranged between the bearing and the control shaft which upon rotation of the control shaft displace the latter in axial direction to open and close the valve.

It is a further object of the present invention to provide a hose coupling wherein in accordance with another embodiment the control shaft is provided with a valve plug for the air which has a bore so that in the one position the control shaft closes the compressed-air feed line passing through the valve plug, while in the other end position the feed line is open.

It is yet another object of the present invention to provide a hose coupling wherein the design of this embodiment is simplified in that the upper bearing of the control shaft is accommodated in a threaded cap which also serves as an abutment for a torsion spring in a manner so that the latter is pre-tensioned when the cap is screwed in.

It is still a further object of the present invention to provide a hose coupling wherein the control shaft protrudes from the coupling body and is provided with a pointer, a handle, or the like, in order to indicate the position of the shutoff device on the outside, or to actuate the shutoff device independently from an actuation of the control shaft, when engaging the coupling.

With these and other objects in view which will become apparent in the following detailed description, the present invention will be clearly understood in connection with the accompanying drawings, in which:

FIGURE 1 is a longitudinal sectional view through a coupling head;

FIG. 2 is a top plan view of the coupling head, shown in FIG. 1;

FIG. 3 is a top plan view of the two coupling halves, one of which is shown as a sectional view in a horizontal plane;

FIGS. 4 to 6 are longitudinal sectional views of other embodiments of the coupling head;

FIG. 7 is a sectional view of two co-operating coupling halves of a different design.

Figure 8:
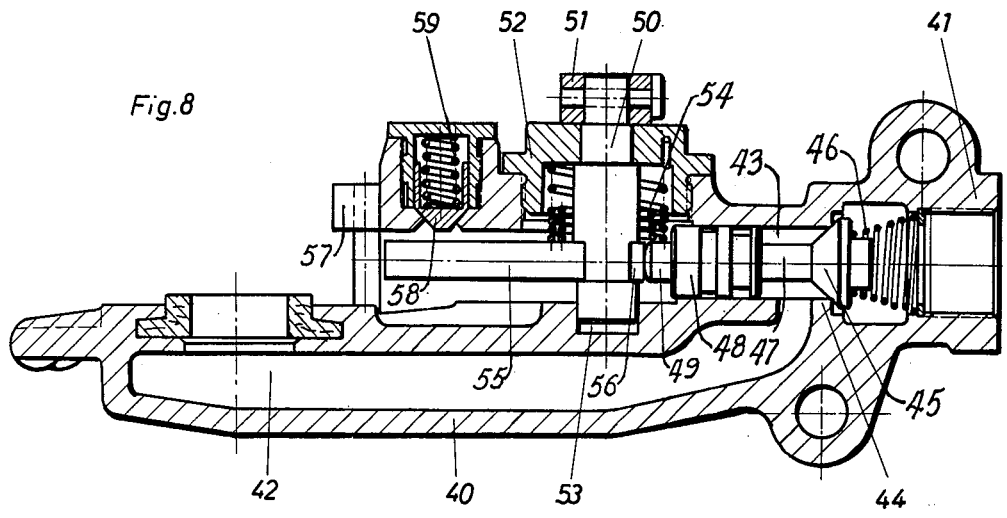
FIGS. 8 to 11 are longitudinal sectional views and top plan views, respectively, of another embodiment of the coupling halves, similar to the embodiment shown in FIGS. 1 to 3.
Figure 9:
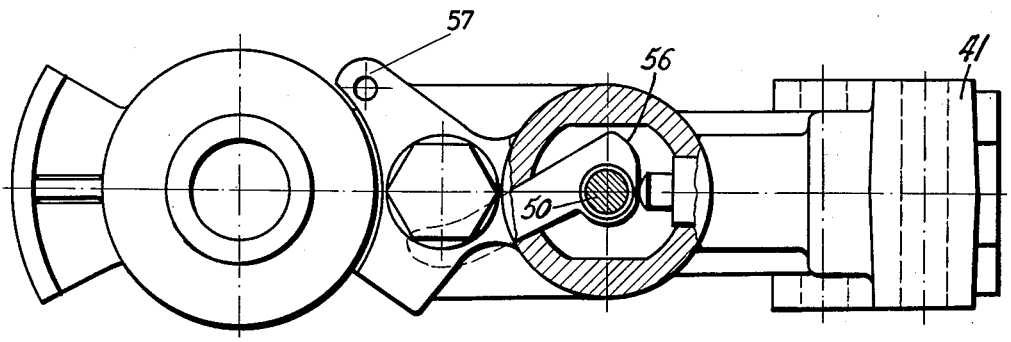

Referring now to the drawings, and in particular to FIGS. 1 to 3, the coupling comprises a coupling head 1 and a mating coupling head 2 which in FIG. 3 is illustrated in a top elevational view. Both coupling halves are provided, in the usual manner, with peripheral projections 3 and 4 which function as guide means and which engage each other like bayonet joint means, when the two coupling heads 1 and 2 are placed upon each other and turned about their axes I—I. An annular gasket 5 provided in the coupling head 1 ensures proper sealing.

Each of the coupling heads 1 and 2 has an adapter 6 or 7 for connection with the hose. The coupling head 1 is adapted to be fitted on a compressed-air feed line and the coupling head 2 on the brake line leading to the trailer.

Referring again to the embodiment shown in FIGS. 1 to 3, the adapter 6 includes the feed line and is provided with a valve seat 8 on which a valve cone 9 rests, which valve cone 9 is subjected to the action of a spring 10 and the pressure of the air in the feed line to close the passage in the valve seat 8.

A chamber 11 behind the valve seat 8 is in communication with the inner chamber 13 of the coupling head 1 by means of a channel 12.

A control shaft 14 is rotatably journalled in the coupling half 1 and disposed parallel with the axis of rotation I—I. A cam 15 is provided on the control shaft 14 level with the path of motion of the projection 4 on the periphery of the other coupling head 2. The cam 15 forms a curved surface 16 on which the shaft 17 of a piston 18 rests. The latter is sealingly guided in the chamber 11 and is provided at its forward end with an extension 19 adapted to co-operate with the valve cone 9.

One end of a volute buffer spring 20 is fastened to the cam 15 and the other end thereof to the bearing cap 21 of the control shaft bearing. The volute buffer spring 20 tends to return the control shaft 14 by turning the curved surface 16 of the cam 15 into the position in which the inlet valve 9 is closed.

The direction of winding of the volute buffer spring 20 and the thread pitch of the bearing cap 21 are designed in such manner that upon screwing in the cap 21, the spring 20 is pretensioned.

A hand lever 23 is mounted outside the coupling head 1, on an abutment 22 of the control shaft 14, which hand lever 23 forms at the same time an indicating device to show whether the valve is opened or closed. On the other hand, when the coupling is disengaged, the valve 9 may be opened or closed by means of the hand lever 23 to enable compressed-air to escape from the feed line or to enable cleaning of the coupling head 1.

The operation of the coupling head disclosed in the embodiment of FIGS. 1 to 3 is performed in the following manner:

When the coupling is out of operation, i.e. when the coupling member 1 is disengaged from the coupling head 2, the spring 20 locks the control shaft 14 in a position shown in FIGS. 1 and 2. The lowest portion of the cam member 15 is below the shaft 17 of the piston 18. The extension 19 of the piston 18 has released the valve cone 9 which closes the passage 8. Compressed air contained in the feed line connected with the adapter 6 cannot escape.

Upon inserting the coupling head 2 into the coupling head 1, the respective projections 3 and 4 engage each other. During the relative turning movement between the coupling heads 1 and 2, the projection 4 of the coupling head 2 engages the cam 15. Thus, the control shaft 14 is taken along and turned clockwise. The hand lever 23 is turned around from the position shown in FIG. 2 into a position (not shown) in the direction of the adapter 6. The curved surface 16 of the cam 15 displaces the piston 18 axially, and eventually, the valve cone 9 is lifted by means of the extension 19 of the piston 18 and opened against the action of the spring 10. The open position is reached when both coupling halves 1 and 2 are in their end engaging position, so that now compressed air may pass from the feed line passing the open valve cone 9 into the trailer brake line.

When the coupling heads 1 and 2 are disengaged again, the volute buffer spring 20 returns the control shaft 14 and in turn the valve cone 9 returns to its closed position. Compressed air cannot escape if the valve cone 9 is not opened again by actuating the hand lever 23.

The coupling head 1a, illustrated in FIG. 4, is provided with an adapter 6a. The lower end of the control shaft 14a extends into a chamber 24 which communicates by means of a passage 25 with the adapter 6a and by means of a channel 26 with the inner chamber 13 of the coupling head 1a. A valve seat 27 is formed at the point of junction between the passage 25 and the chamber 24, to accommodate a valve cone 28, formed by the lower end of the control shaft 14a. The valve structure 28 replaces the valve structure 9 of the above described embodiment.

The control shaft 14a is axially displaceable in its bearing in the threaded cap 21a. A spiral groove 29 is provided on the outer face of the shaft 14a, which groove 29 receives a guide pin (not shown), projecting radially from the face of the bore of the threaded cap 21a, and is received by said spiral groove 29.

The cam 15a, mounted on the shaft 14a and co-operating with the projection 4 of the coupling head 2 (FIG. 3), has a smaller diameter than that of the cam 15 of the embodiment disclosed in FIG. 1. A gasket 30 seals the chamber 24 from the outside.

It can be seen that upon engaging and relative turning of the coupling heads 1a and 2 the control shaft 14a is turned through a predetermined angle by means of engagement between the projection 4 and the cam 15a. During this movement, the stationary pin projecting from the bore slides in the spiral groove 29 of the control shaft 14a, whereby the control shaft 14a is axially displaced, and the valve cone 28 is lifted off its seat 27. Upon disengaging the coupling heads 1a and 2, the volute buffer spring 20 returns the control shaft 14a into closing position.

The embodiment of the coupling head, disclosed in FIG. 5 is similar to that disclosed in FIG. 4. The only difference between these two embodiments resides in the arrangement according to which the valve cone 28, formed by the lower end of the control shaft 14a, closes the discharge line 26a, while the feed line 25a opens directly into the chamber 24.

Referring now to the embodiment of the coupling head disclosed in FIG. 6, the coupling head 1b comprises an adapter 6b, and a control shaft 14b. The lower end of the latter forms a cone 31. The shaft 14b is inserted, by means of a spring 32 and a screw bolt 33, into the complementary seat 34 provided in the body of the coupling member 1b. The cone 31 has a transverse bore 36 which registers with the passage 35 connecting the adapter 6b with the inner chamber 13 of the coupling member 1b. Upon turning the control shaft 14b, the passage 35 may be opened and closed, respectively.

FIG. 7 discloses two coupling heads 1c and 2c, wherein the coupling head 1c is provided with a guide bore 37 and the coupling head 2c with a guide pin 38 in order to center both coupling heads 1c and 2c relative to each other.

Referring now to the embodiment of the coupling disclosed in FIGS. 8 to 11, the coupling requires a longer coupling head 40 which includes an adapter 41 and forms a chamber 42. The latter communicates with the compressed-air feed line by means of a cylindrical chamber 43, the latter to be closed from the feed line by a spring-biased shut-off device which comprises a valve seat 44 which receives a valve cone 45 subjected to the action of a compression spring 46. The valve cone 45 is mounted on a rod 47 which is connected with a piston 48 sealingly moving in the chamber 43 and which has an extension 49. A control shaft 50 carrying a hand lever 51 is guided in a removable threaded cap 52 and in a bearing 53 provided in the body of the coupling head 40. A pretensioned volute buffer spring 54 tends to turn the control shaft 50 into a predetermined valve closing position. The shaft 50 carries a cam 55 terminating in a cam surface 56. The extension 49 of the valve piston 48 engages the cam surface 56. The hand lever 51 permits manual operation of the control shaft 50 and functions as a pointer and indicator in order to indicate the closed and open position, respectively, of the shut-off device.

A locating member 58 biased by a helical spring 59 is disposed adjacent the control shaft 50 and in a guide 57, the locating member 58 being locked in the engaged position of the coupling in a recess provided in the coupling head 60, so that both coupling heads 40 and 60 are secured in position when engaged.

Figure 10:
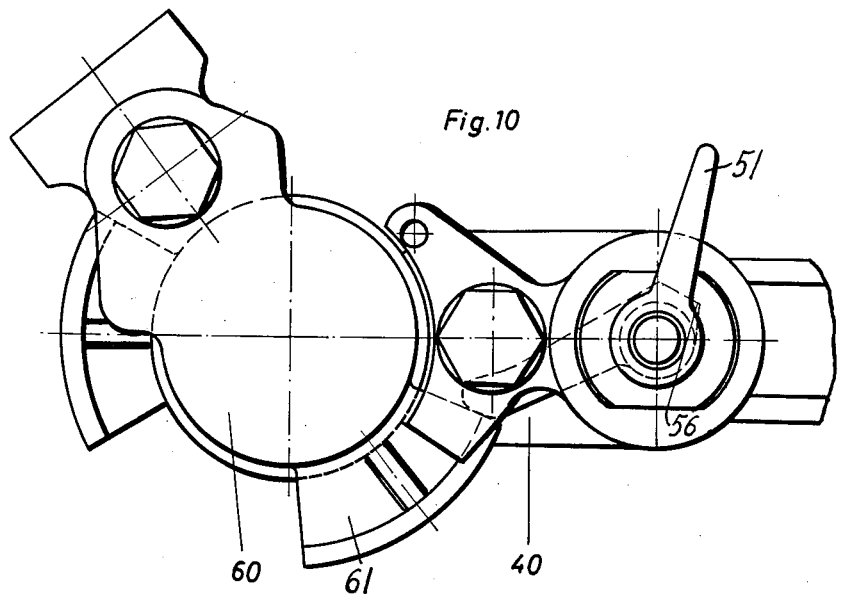
Figure 11:
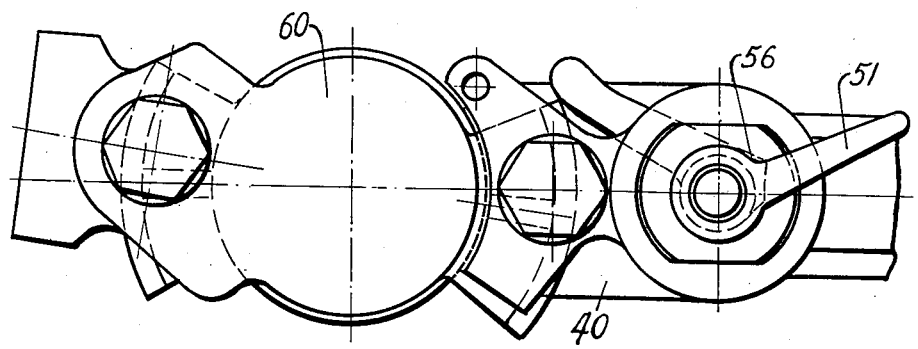

The operation of the last described embodiment of the coupling is the same as above in connection with the first embodiment. When the coupling head 60 enters into engagement with the coupling head 40, a projection of the bayonet joint means 61 turns the cam 55 and the control shaft 50 and the turning of the cam 55 causes an opening movement of the valve cone 45, simultaneously compressing the spring 46. FIG. 10 shows the position of the coupling head 40 and of the coupling head 60 before they are engaged and turned, i.e. a position in which the valve cone 45 is still in closing position. FIG. 11 shows, however, both coupling heads 40 and 60 in engagement and upon termination of the relative turning movement. It can be seen that the valve cone 45 has now been raised from its seat by the cam 55 and the control shaft 50, respectively. When the coupling heads 40 and 60 are again disengaged, the valve cone 45 is automatically lowered to its seat. On the other hand, compressed air may escape out of the feed line when, by means of manual operation of the lever 51, the control shaft 50 is turned into open position against the action of the spring 54.

While I have disclosed several embodiments of the present invention, it is to be understood that these embodiments are given by example only and not in a limiting sense, the scope of the present invention being determined by the objects and the claims.

I claim:
1. A hose coupling for truck brakes comprising
   a first coupling head having a fluid passage therethrough and adapted to be fitted to a compressed-air feed line,
   a second coupling head having a fluid passage therethrough and adapted to be fitted to a trailer brake line,
   said coupling heads having complementary bayonet joint means for engagement of said coupling heads upon relative rotary movement of the latter,
   said bayonet joint means including peripheral projections,
   an adapter coordinated to each of said coupling heads,
   a shut-off device disposed in said passage way on said first coupling head outside the axis of rotation of said coupling heads,
   a control shaft rotatably mounted in said first coupling head,
   cam means carried by said control shaft including means disposed for joint rotation therewith in a plane disposed within the path of said projection of said bayonet joint means and operatively connected to said shut-off device for cooperation therewith,
   a cap affixed to said first coupling head and forming a bearing for an surrounding said control shaft,
   a pretensioned spring secured to said cap and to said control shaft, respectively, and disposed between said cap and said cam carried by said control shaft,
   so that upon joining said coupling heads by relative rotation of the latter said projection of said bayonet joint means turns said cam and thereby, said control shaft and causes opening of said passage way and connection of the latter with said trailer brake line.
2. The hose coupling, as set forth in claim 1, wherein said connecting means includes a reciprocating shaft engaging said cam and moved by said cam to put said shut-off device into its open position.
3. The hose coupling, as set forth in claim 1, wherein said control shaft forms at its free end said shut-off device, and
   said cam means associated with said control shaft and with said cap causing axial displacement of said control shaft upon rotation of the latter, whereby said shut-off device is opened and closed, respectively.
4. The hose coupling, as set forth in claim 1, in which said shut-off device comprises
   a valve cone formed at the free end of said control shaft, so that upon rotation of said control shaft said shut-off device assumes its open and closed position, respectively.
5. The hose coupling, as set forth in claim 1, wherein said cap is threaded to said first coupling head, so that upon threatedly mounting said cap on said first coupling head, said spring is tensioned.
6. The hose coupling, as set forth in claim 1, wherein said control shaft has a protruding end, and a hand lever is secured to said protruding end of said control shaft.

References Cited in the file of this patent
UNITED STATES PATENTS

| | | |
|---|---|---|
| 559,389 | Kinyon | May 5, 1896 |
| 621,764 | Brown | Mar. 21, 1899 |
| 859,236 | Maier et al. | July 9, 1907 |
| 1,208,162 | Jungjohann | Dec. 12, 1916 |
| 1,226,101 | Marsden | May 15, 1917 |
| 2,163,519 | Price | June 20, 1939 |
| 2,392,118 | Cacarillo | Jan. 1, 1946 |

FOREIGN PATENTS

| | | |
|---|---|---|
| 195,282 | Austria | Jan. 25, 1958 |